(12) United States Patent
Palumbo

(10) Patent No.: US 8,492,457 B2
(45) Date of Patent: Jul. 23, 2013

(54) METHOD OF PREPARING PIGMENT COMPOSITIONS

(75) Inventor: Paul S. Palumbo, West Newton, MA (US)

(73) Assignee: Cabot Corporation, Boston, MA (US)

( * ) Notice: Subject to any disclaimer, the term of this patent is extended or adjusted under 35 U.S.C. 154(b) by 61 days.

(21) Appl. No.: 12/906,181

(22) Filed: Oct. 18, 2010

(65) Prior Publication Data

US 2011/0060098 A1  Mar. 10, 2011

Related U.S. Application Data

(62) Division of application No. 11/491,339, filed on Jul. 21, 2006, now abandoned.

(60) Provisional application No. 60/702,079, filed on Jul. 22, 2005.

(51) Int. Cl.
*C09D 11/00* (2006.01)

(52) U.S. Cl.
USPC ............................................ 523/160; 524/556

(58) Field of Classification Search
USPC ................................................ 523/160, 161
See application file for complete search history.

(56) References Cited

U.S. PATENT DOCUMENTS

| | | | |
|---|---|---|---|
| 4,014,844 A | 3/1977 | Vidal et al. |
| 4,166,811 A | 9/1979 | Marr et al. |
| 4,567,213 A | 1/1986 | Bhatia et al. |
| 4,713,411 A | 12/1987 | Kanou et al. |
| 5,039,339 A | 8/1991 | Phan et al. |
| 5,141,556 A | 8/1992 | Matrick |
| 5,298,535 A | 3/1994 | Kammer |
| 5,698,016 A | 12/1997 | Adams et al. |
| 5,795,376 A | 8/1998 | Ide |
| 5,948,155 A | 9/1999 | Yui et al. |
| 5,952,429 A | 9/1999 | Ikeda et al. |
| 5,964,935 A | 10/1999 | Chen et al. |
| 6,068,688 A | 5/2000 | Whitehouse et al. |
| 6,074,467 A | 6/2000 | Tabayshi et al. |
| 6,110,994 A | 8/2000 | Cooke et al. |
| 6,150,433 A | 11/2000 | Tsang et al. |
| 6,221,143 B1 | 4/2001 | Palumbo |
| 6,221,932 B1 | 4/2001 | Moffatt et al. |
| 6,235,829 B1 | 5/2001 | Kwan |
| 6,336,965 B1 | 1/2002 | Johnson et al. |
| 6,372,820 B1 | 4/2002 | Devonport |
| 6,432,194 B2 | 8/2002 | Johnson et al. |
| 6,458,458 B1 | 10/2002 | Cooke et al. |
| 6,472,471 B2 | 10/2002 | Cooke et al. |
| 6,478,863 B2 | 11/2002 | Johnson et al. |
| 6,641,656 B2 | 11/2003 | Yu et al. |
| 6,699,319 B2 | 3/2004 | Adams et al. |
| 6,723,783 B2 | 4/2004 | Palumbo et al. |
| 6,765,039 B1 | 7/2004 | Basak et al. |
| 6,838,521 B2 | 1/2005 | Yoon et al. |
| 6,911,073 B2 | 6/2005 | Adams et al. |
| 6,916,367 B2 | 7/2005 | Palumbo |
| 7,005,461 B2 | 2/2006 | Sanada et al. |
| 7,030,174 B2 | 4/2006 | Yatake |
| 7,056,962 B2 | 6/2006 | Johnson et al. |
| 7,173,078 B2 | 2/2007 | Lamprey et al. |
| 7,176,249 B2 | 2/2007 | Akutsu et al. |
| 7,220,307 B2 | 5/2007 | Kano et al. |
| 7,459,491 B2 | 12/2008 | Tyvoll et al. |
| 7,544,238 B1 | 6/2009 | Belmont |
| 7,649,031 B2 | 1/2010 | Johnson et al. |
| 2002/0147252 A1 | 10/2002 | Adams |
| 2003/0108667 A1* | 6/2003 | McIntyre et al. ............. 427/212 |
| 2004/0048973 A1* | 3/2004 | Akutsu et al. ................ 524/543 |
| 2006/0178447 A1 | 8/2006 | Burns et al. |
| 2007/0126839 A1 | 6/2007 | Kelly-Rowley et al. |
| 2007/0129462 A1 | 6/2007 | Ma |
| 2007/0129463 A1 | 6/2007 | Ma et al. |
| 2007/0219291 A1 | 9/2007 | Doi et al. |
| 2007/0224345 A1 | 9/2007 | Metz et al. |
| 2007/0277699 A1 | 12/2007 | Bauer |

OTHER PUBLICATIONS

FR1427492 to Edward A. Gill (Feb. 2, 1966)—Abstract Only.
International Preliminary Report on Patentability for PCT/US2006/028319 mailed Jan. 31, 2008.

* cited by examiner

*Primary Examiner* — Doris Lee

(57) ABSTRACT

The present invention relates to a method of preparing a pigment composition comprising the steps of combining a polymer and a pigment to form a mixture and heating the mixture to a temperature of between about 70° C. and 250° C. to form the pigment composition. The method may further comprise the step of dispersing the pigment composition in an aqueous medium to form an aqueous pigment dispersion. The pigment compositions and aqueous pigment compositions can be used in an inkjet ink composition, which is also disclosed.

25 Claims, No Drawings

METHOD OF PREPARING PIGMENT COMPOSITIONS

CROSS REFERENCE TO RELATED APPLICATIONS

This application is a divisional of and claims priority to U.S. patent application Ser. No. 11/491,339, filed on Jul. 21, 2006, which claims the benefit of U.S. Provisional Patent Application 60/702,079, filed on Jul. 22, 2005. Both priority applications are incorporated by reference in their entirety.

BACKGROUND OF THE INVENTION

1. Field of the Invention

The present invention relates to pigment compositions, methods for preparing pigment compositions, as well as aqueous dispersions and inkjet ink compositions comprising these pigment compositions.

2. Description of the Related Art

An inkjet ink composition generally consists of a vehicle, which functions as a carrier, and a colorant such as a dye or pigment. Additives and/or cosolvents can also be incorporated in order to adjust the inkjet ink to attain the desired overall performance properties.

In general, pigments alone are not readily dispersible in liquid vehicles. A variety of techniques have been developed which can provide stable pigment dispersions that can be used in inkjet printing. For example, dispersants can be added to the pigment to improve its dispersibility in a particular medium. Examples of dispersants include water-soluble polymers and surfactants. Typically, these polymeric dispersants have a molecular weight less than 20,000 in order to maintain solubility and therefore pigment stability.

The surface of pigments contain a variety of different functional groups, and the types of groups present depend on the specific class of pigment. Several methods have been developed for grafting materials and, in particular, polymers to the surface of these pigments. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Methods for the preparation of modified pigment products have also been developed which can provide a pigment with a variety of different attached functional groups. For example, U.S. Pat. No. 5,851,280 discloses methods for the attachment of organic groups onto pigments including, for example, attachment via a diazonium reaction wherein the organic group is part of the diazonium salt.

Other methods to prepare modified pigments, including those having attached polymeric groups, have also been described. For example, PCT Publication No. WO 01/51566 discloses methods of making a modified pigment by reacting a first chemical group and a second chemical group to form a pigment having attached a third chemical group. Ink compositions, including inkjet inks, containing these pigments are also described. Also, U.S. Pat. No. 5,698,016 discloses a composition comprising an amphiphilic ion and a modified carbon product comprising carbon having attached at least one organic group. The organic group has a charge opposite to the amphiphilic ion. Also disclosed are aqueous and non-aqueous ink and coating compositions incorporating this composition, including ink jet ink compositions. Also, polymer coated carbon products and methods for their preparation are described in U.S. Pat. No. 6,458,458.

While these methods provide modified pigments having attached groups, there remains a need for improved processes for preparing pigment compositions, particularly those that comprise polymers, thereby providing advantageous alternatives to forming modified pigments.

SUMMARY OF THE INVENTION

The present invention relates to a method of preparing a pigment composition comprising the steps of combining a polymer and a pigment to form a mixture, and heating the mixture to a temperature of between about 70° C. and 250° C. to form the pigment composition. Preferably, the polymer comprises at least one ammonium salt of a carboxylic acid group. Also disclosed is the pigment composition resulting from this method.

The present invention further relates to a method of preparing an aqueous pigment dispersion comprising the steps of forming a pigment composition as described herein and dispersing the pigment composition in water to form the aqueous pigment dispersion. Also disclosed is the aqueous pigment dispersion resulting from this method.

The present invention further relates to an inkjet ink composition comprising a liquid vehicle and either a pigment composition as described herein or an aqueous pigment dispersion comprising this pigment composition described herein. Preferably, the pigment composition and aqueous pigment dispersion are prepared using the methods described herein and the liquid vehicle is an aqueous vehicle.

It is to be understood that both the foregoing general description and the following detailed description are exemplary and explanatory only and are intended to provide further explanation of the present invention, as claimed.

DETAILED DESCRIPTION OF THE INVENTION

The present invention relates to methods for preparing pigment compositions and aqueous pigment dispersions, as well as to the resulting pigment compositions and aqueous pigment dispersions, and further relates to inkjet ink compositions comprising them.

The method of the present invention comprises the step of combining a polymer and a pigment to form a mixture. The resulting mixture is subsequently heated to form a polymer composition. In a preferred embodiment, the method of the present invention further comprises the step of dispersing the polymer composition in an aqueous medium to form an aqueous pigment dispersion. Each of these steps will be described in more detail below.

In the method of the present invention, a polymer and a pigment are combined to form a mixture. The polymer is preferably a water soluble polymer, such as a polymer comprising a polyalkylene oxide group, a polymer comprising quaternary ammonium groups, a polymer comprising groups resulting from the polymerization of vinyl acetate followed by hydrolysis (such as polyvinyl alcohol), polymers comprising groups resulting from the polymerization of vinyl pyrrolidone (such as poly-N-vinyl pyrrolidone), and polymer comprises at least one acid group, such as a sulfonic acid group or a carboxylic acid group, or a salt thereof, including sodium, potassium, and ammonium salts. Most preferred are polymers comprising at least one salt of a carboxylic acid group, especially at least one ammonium salt of a carboxylic acid group. For this preferred embodiment, any polymer having such a group may be used including, for example, polymers prepared by the polymerization of monomers comprising a carboxylic acid group or salt thereof and polymers prepared by the polymerization of monomers comprising groups which can be converted to carboxylic acid groups or salts thereof. The polymer can be a homopolymer or copolymer comprising the ammonium carboxylate salt group, and can be a random polymer, an alternating polymer, a graft polymer, a block polymer, a star-like polymer, and/or a comb-like polymer. Preferably, the polymer comprises at least 10% by weight of the ammonium carboxylic acid salt groups, more preferably at least 20% by weight, and most preferably at least 30% be weight. The polymer may also comprise multiple types of carboxylic acid groups, at least one of which is in the form of an ammonium salt. Examples of polymers useful in the method of the present invention include, but are not limited to, ammonium acrylate or methacrylate polymers, such as styrene-ammonium acrylate or styrene-ammonium methacrylate copolymers.

The molecular weight of the polymer may vary depending on a variety of factors. For example, polymer molecular weight effects the solubility of the polymer, the viscosity of the resulting solution, as well as the form of the polymer (solid, wax, viscous liquid, or free flowing liquid). This may also effect the mixing or heating conditions used in the method of the present invention, which are described in more detail below. Preferably, the polymer has a molecular weight below about 20,000, such as between about 2,000 and 15,000, more preferably between about 5,000 and 12,000, and most preferably between about 8,000 and 10,000.

The pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearl® 1300, Black Pearl® 1100, Black Pearl® 1000, Black Pearl® 900, Black Pearl® 880, Black Pearl® 800, Black Pearl® 700, Black Pearl® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982). Preferably the pigment is a cyan, magenta, yellow, or black pigment, such as carbon black.

The pigment can have a wide range of BET surface areas, as measured by nitrogen adsorption, depending on the desired properties of the pigment. As known to those skilled in the art, a higher surface area will correspond to smaller particle size. If a higher surface area is not readily available for the desired application, it is also well recognized by those skilled in the art that the pigment may be subjected to conventional size reduction or comminution techniques, such as ball or jet milling, to reduce the pigment to a smaller particle size, if desired.

The pigment may also be a modified pigment comprising any of the pigments described above. For example, the modified pigment may comprise a pigment having attached at least one ionic group, ionizable group, or mixture thereof. Examples include pigments that have been oxidized using an oxidizing agent in order to introduce ionic and/or ionizable groups onto the surface. Modified pigments prepared in this way have been found to have a higher degree of oxygen-containing groups on the surface. Oxidizing agents include, but are not limited to, oxygen gas, ozone, peroxides such as hydrogen peroxide, persulfates, including sodium and potassium persulfate, hypohalites such a sodium hypochlorite, oxidizing acids such a nitric acid, and transition metal containing oxidants, such as permanganate salts, osmium tetroxide, chromium oxides, or ceric ammonium nitrate. Mixtures of oxidants may also be used, particularly mixtures of gaseous oxidants such as oxygen and ozone. Other surface modification methods to introduce ionic or ionizable groups onto a pigment surface, such as chlorination and sulfonylation, may also be used.

In addition, the modified pigment may comprise a pigment having attached at least one organic group, wherein the organic group comprises at least one ionic group, at least one ionizable group, or mixtures thereof. These modified pigments may be prepared using any method known to those skilled in the art such that organic chemical groups are attached to the pigment. For example, the modified pigments can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference. Such methods provide for a more stable attachment of the groups onto the pigment compared to dispersant type methods, which use, for example, polymers and/or surfactants.

The ionic group can be either anionic or cationic and is associated with a counterion of the opposite charge including inorganic or organic counterions such as $Na^+$, $K^+$, $Li^+$, $NH_4^+$, $NR'_4^+$, acetate, $NO_3^-$, $SO_4^{-2}$, $R'SO_3^-$, $R'OSO_3^-$, $OH^-$, and $Cl^-$, where R' represents hydrogen or an organic group such as a substituted or unsubstituted aryl and/or alkyl group. The ionizable group is one that is capable of forming an ionic group in the medium of use. Anionizable groups form anions and cationizable groups form cations. Preferably, the attached group is an organic group. Organic ionic groups include those described in U.S. Pat. No. 5,698,016, the description of which is fully incorporated herein by reference.

Anionic groups are negatively charged ionic groups that may be generated from groups having ionizable substituents that can form anions (anionizable groups), such as acidic substituents. They may also be the anion in the salts of ionizable substituents. Representative examples of anionic groups include $-COO^-$, $-SO_3^-$, $-OSO_3^-$, $-HPO_3^-$, $-OPO_3^{-2}$, and $-PO_3^{-2}$. Representative examples of anionizable groups include $-COOH$, $-SO_3H$, $-PO_3H_2$, $-R'SH$, $-R'OH$, and $-SO_2NHCOR'$, where R' represents hydrogen or an organic group such as a substituted or unsubstituted aryl and/or alkyl group. For example, the attached group may comprise a carboxylic acid group, a sulfonic acid group, a sulfate group, or salts thereof, such as a benzene carboxylic acid group, a benzene dicarboxylic acid group, a benzene tricarboxylic acid group, a benzene sulfonic acid group, or salts thereof. The attached organic group may also be a substituted derivative of any of these.

Cationic groups are positively charged organic ionic groups that may be generated from ionizable substituents that can form cations (cationizable groups), such as protonated amines. For example, alkyl or aryl amines may be protonated in acidic media to form ammonium groups —$NR'_2H^+$, where R' represent an organic group such as a substituted or unsubstituted aryl and/or alkyl group. Cationic groups may also be positively charged organic ionic groups. Examples include quaternary ammonium groups (—$NR'_3{}^+$) and quaternary phosphonium groups (—$PR'_3{}^+$). Here, R' represents hydrogen or an organic group such as a substituted or unsubstituted aryl and/or alkyl group.

When the modified pigment comprises a pigment having attached organic groups, the organic group may be polymeric. Preferably, the polymeric group comprises the ionic or ionizable groups described above. Thus, the organic group may be a polymeric group comprising one or more anionic or anionizable groups. Examples include, but are not limited to, polyacids such as polyacrylic acid, polymethacrylic acid, copolymers of acrylic acid or methacrylic acid, including styrene-acrylic acid polymers, and hydrolyzed derivatives of maleic anhydride-containing polymers. The organic group may also be a polymeric group comprising one or more cationic or cationizable groups. Examples include, but are not limited to, linear or branched polyamines such as polyethyleneimine (PEI), oligomers of ethyleneimine (such as pentaethyleneamine, PEA) and derivatives of polyethyleneimine.

As stated above, in the method of the present invention, the polymer and the pigment are combined to form a mixture. This mixture may be either in a dry form or may be in the form of a dispersion or suspension, depending on the form of the polymer and the pigment used to prepare it. For example, the polymer may either be in a solid form (such as a powder or wax) or in a liquid form (such as a viscous or non-viscous liquids, including syrups or oils). Also, the polymer may be in the form of an aqueous or non-aqueous polymer solution, suspension, dispersion, or emulsion. Preferably, the polymer may be in the form of a polymer solution, and, in particular, an aqueous polymer solution comprising water or mixtures of water with water miscible solvents such as alcohols. In addition, the pigment may be either in a dry form (such as a powder, pellet, or press cake) or in the form of an aqueous or non-aqueous dispersion or suspension in a liquid. Also, the pigment may be in the form of a wet press cake, containing between about 20-80% of a liquid, such as water, but still in solid or semi-solid form. Preferably, the pigment is in the form of a pigment suspension or dispersion and, in particular, an aqueous pigment suspension or dispersion comprising water or mixtures of water with water miscible solvents such as alcohols. If either the polymer or the pigment is in a form that includes a liquid medium, such as a solution, dispersion, or suspension, then the resulting mixture will therefore be in a similar form. Alternatively, if neither the polymer nor the pigment are in a form comprising a liquid medium, then the resulting mixture will be in a solid or semi-solid form, including, for example, a free flowing or tacky powder, paste, or putty. Finally, if either the polymer or the pigment, but not both, are in a form that includes a liquid medium, then the resulting mixture may have either a liquid or solid form, depending on the amount of liquid medium used.

The polymer and pigment can be combined using any technique or equipment known in the art, depending on the form of the components and the mixture that is produced. For example, if both the polymer and pigment are not in a form having a liquid medium or the resulting mixture is in a solid or semi-solid form, high intensity mixing conditions can be used. Such conditions are known to one skilled in the art and can be achieved using a variety of high intensity mixers and similar equipment that are designed to mix, blend, stir, homogenize, disperse, and/or compound materials. The high intensity mixer can be batch, semi-continuous, or continuous mixer, but a continuous mixer offers both economic and practical advantages to batch processing equipment and is generally preferred. Examples of high intensity mixers include, but are not limited to, single or double planetary mixers, dual shaft planetary mixers (particularly those in which one shaft has a saw tooth blade), helical mixers such as double helical mixers or twin blade conical mixers, double arm kneading mixers such as a Brabender or Farrel mixer, high intensity mixers such a Henschel or papenmeir mixers, two or three roll mixers, and single or double (twin) screw extruders. The high intensity mixing conditions may also include low pressure conditions resulting from the use of a vacuum.

If, for example, the polymer and/or the pigment are in a form comprising a liquid medium, and the resulting mixture is also in such a form, high shear mixing may be used. Thus, the mixing may take place in a suitable vessel under high shear conditions utilizing equipment capable of providing a grinding or impact action, such as liquid shear cavitation or other means of particle size reduction. Different shearing devices can be used in combination or in series such as horizontal media mills, vertical media mills such as attritors, ball mill, hammer mills, pin disk mills, fluid energy mills, jet mills, sonicators, and the like. Preferably, the high shearing occurs in high pressure fluid impingement reactors. Other examples include, but are not limited to, high pressure homogenizers, rotor stators, distributive devices, impact dispersers (media/ball), and the like.

The polymer and pigment can be combined for a time and at a temperature sufficient to produce the desired mixture. Both the mixing time and temperature will depend on several factors, including, for example, the type and form of the pigment, the type, molecular weight, and form of the polymer, and the relative amounts of each. Typically, the components are combined at a temperature ranging between about 5° C. to about 70° C., preferably between about 15° C. to about 50° C., and more preferably between about 20° C. to about 30° C. An increase in temperature may occur during the combining step depending on the type of mixing equipment used. The mixing time is generally between about 5 minutes to about 24 hours, preferably from about 10 minutes to about 12 hours, and more preferably from about 30 minutes to about 2 hours.

After the mixture is prepared, the method of the present invention further comprises the step of heating the mixture to a temperature of between about 70° C. and 250° C. to form a pigment composition. The heating can be done using any known equipment capable of raising the temperature of the mixture to the desired temperature range. Examples include heating mantles, thermocouples, thermal baths, and the like. Also included are high intensity mixers and high shear mixers, which are discussed above and may increase the temperature during mixing. Preferably, the mixture is heated to a temperature of between about 100° C. and 200° C. and more preferably between about 140° C. and 185° C. In addition, the heating may be done under inert atmosphere, such as nitrogen or argon.

The mixture is heated for a time sufficient to form the desired pigment composition. This time will depend on a variety of factors, including the type of polymer, reaction scale, and relative ratio of pigment to polymer. In addition, if the mixture is in a form comprising a liquid medium or was prepared using either a pigment or a polymer in a form comprising a liquid medium, the medium is also removed during the heating step. Thus, the heating step may also be a drying step in which the medium evaporates, and the time for the heating would include the time necessary to dry the mixture.

In a preferred embodiment of the method of the present invention, the mixture is heated for a time sufficient to convert a substantial amount of ammonium carboxylic acid salt groups to ammonia, which is removed during the heating. Typically, the mixture is heated for a time ranging between about 5 minutes and 5 days, such as between about 1 hour and about 3 days. Any method of drying known in the art may also used be used for the heating step including, for example, oven drying, spray drying, and flash evaporation.

The polymer and the pigment may be combined in a variety of ratios, depending on the form of each component. For example, if both the polymer and pigment are added in a form not comprising a liquid medium, the amount of each component may preferably range between about 5:1 and 1:5 by weight pigment to polymer, more preferably between about 5:1 and 1:1 by weight pigment to polymer, and most preferably between about 2:1 and 1:1 by weight pigment to polymer. If the pigment and/or the polymer are in a form comprising a liquid medium, the amount of each component will depend on the concentration of the pigment or the polymer. The polymer solution, dispersion, suspension, or emulsion concentrations will typically range between about 0.1% and 25% by weight, preferably between about 1% and 20% by weight, and more preferably between about 2% and 10% by weight. The pigment dispersion or suspension will typically range between 1% and 25% by weight, preferably between about 2% and 20% by weight, and more preferably between about 5% and 15% by weight. The amount added or the concentration used can be adjusted such that the ratio of pigment to polymer falls within the ranges described above.

In the method of the present invention, a polymer and a pigment are combined to form a mixture, and the mixture is heated to form a pigment composition. The resulting pigment composition comprises greater than 50%, preferably greater than 60%, more preferably greater than 70% pigment. Thus, the pigment compositions of the present invention differ from polymer compositions, such as coatings, inks, and the like, since these compositions comprise a pigment dispersed in a polymer. Typical coating and ink compositions produce coatings or images that comprise less than 50% by weight pigment.

While not wishing to be bound by theory, it is believed that, after the polymer and pigment mixture is heated, a chemical and/or physical change occurs to the polymer without additional reaction to the pigment surface. Thus, it is believed that the method of the present invention does not induce a reaction of the pigment with the polymer but rather a conversion of the polymer itself. For example, if the polymer comprises at least one ammonium salt of a carboxylic acid group, it is believed that, upon heating, the ammonium carboxylic acid salt group converts to a carboxylic acid group. The polymer may also, or separately, undergo a crosslinking reaction, wherein the molecular weight of the polymer increases during heating. It is believed that the resulting polymer composition therefore comprises a pigment and a polymer that is different from the polymer used to prepare it. This method has been found to be capable of producing a pigment composition having higher levels of attached polymer than alternative methods.

The method of the present invention may further comprise the step of dispersing the polymer composition to form a pigment dispersion. Preferably the polymer composition is dispersed in an aqueous medium comprising water or mixtures of water with water miscible solvents, thereby forming an aqueous pigment dispersion. If the pigment composition is formed from a mixture comprising an aqueous medium, then this step may also be referred to as a redispersion step, and the aqueous medium may be the same or different in this case.

Any method known in the art for preparing pigment dispersions may be used for this dispersion (or redispersion) step. For example, the dispersion may be formed using high shear mixing conditions, and any of the equipment or methods described above may be used. A preferred method comprises the use of base, either alone or in combination with high shear mixing conditions. For example, a water soluble base such as an hydroxide reagent, which is a base that comprises an $OH^-$ ion including sodium hydroxide, potassium hydroxide, lithium hydroxide, and ammonium hydroxide, may be used to disperse the pigment composition. Other hydroxide salts, as well as mixtures of hydroxide reagents, can also be used. Furthermore, other alkaline reagents may also be used which generate $OH^-$ ions in an aqueous medium. Examples include carbonates such as sodium carbonate, bicarbonates such as sodium bicarbonate, and alkoxides such as sodium methoxide and sodium ethoxide.

Thus, the present invention further relates to an aqueous pigment dispersion comprising the pigment composition described above. The amount of the pigment composition used will vary depending of the relative amount of pigment and polymer but will be sufficient to produce an aqueous pigment dispersion comprising between about 0.1% and 25% by weight pigment. While the aqueous pigment dispersion of the present invention can be prepared using a minimum of additional components, suitable additives may also be included in order to impart various properties to the aqueous pigment dispersion, including improved dispersion stability. Other additive may include those describe in more detail below relating to the inkjet ink compositions of the present invention.

The aqueous pigment dispersions of the present invention may be further purified and/or classified in order to remove impurities or undesirable free species which may co-exist in the dispersion. For example, the aqueous pigment dispersions may be washed, such as by filtration, centrifugation, or a combination of the two methods, to remove unreacted raw materials, byproduct salts and other reaction impurities. The products may also be isolated, for example, by evaporation or recovered by filtration and drying using known techniques to those skilled in the art. Also, known techniques of ultrafiltration/diafiltration using a membrane or ion exchange may be used to purify the dispersion and remove a substantial amount of free ionic and unwanted species. An optional exchange of counterions step may also occur in the purification process whereby the counterions that form a part of the aqueous pigment dispersion are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, and $Mg^{2+}$.

The pigment compositions and aqueous pigment dispersions of the present invention may be useful in a variety of applications, including, but not limited to inks, coatings, plastics, paper, textiles, and rubber products. In particular, these have been found to be effective in inkjet ink compositions, particularly aqueous inkjet ink compositions.

Thus, the present invention also relates to an inkjet ink composition comprising a) a liquid vehicle and b) either the pigment composition of the present invention or the aqueous pigment dispersion of the present invention. Preferably the pigment composition or the aqueous pigment dispersion is prepared using the method of the present invention, described in more detail above.

In general, an inkjet ink composition consists of a vehicle, which functions as a carrier, and a colorant such as a dye or pigment. Additives and/or cosolvents can be incorporated in order to adjust the ink to attain the desired performance. Preferably, the liquid vehicle for the inkjet ink compositions of the present invention is an aqueous vehicle, and the inkjet ink composition is therefore an aqueous inkjet ink composition. The aqueous vehicle can be the same as described above in relation to the method of preparing the modified organic colorant dispersion.

The pigment composition or aqueous pigment dispersion used in the inkjet ink compositions of the present invention are the same as described above and are present in an amount effective to provide the desired image quality (for example, optical density) without detrimentally affecting the performance of the inkjet ink. For example, typically the pigment composition or aqueous pigment dispersion will be used in order to provide an inkjet ink composition comprising an amount of pigment ranging from about 0.1% to about 20% based on the weight of the ink. Mixtures of colorants may also be used. In addition, it is also within the bounds of the present invention to use a formulation containing a modified pigment product as described in, for example, U.S. Pat. Nos. 5,630,868, 5,803,959, 5,837,045, and 5,922,118, all incorporated in their entirety by reference.

The inkjet ink compositions of the present invention can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides, binders, drying accelerators, penetrants, and the like. The amount of a particular additive will vary depending on a variety of factors but are generally present in an amount ranging between 0% and 40%.

Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink compositions can be purified and/or classified using methods such as those described above for the pigment compositions and aqueous pigment dispersions described above. In this way, unwanted impurities or undesirable large particles can be removed to produce an inkjet ink with good overall properties.

The present invention will be further clarified by the following examples which are intended to be only exemplary in nature.

EXAMPLES

Examples 1-4

Preparation of Aqueous Pigment Dispersions

The following examples describe the preparation of an aqueous pigment dispersion of the present invention using the method of the present invention.

Example 1

A mixture of 30 g of Joncryl 683 (a water soluble styrene acrylic copolymer having a molecular weight, Mw, of 8,000-10,000 and an acid number of 165, available from Johnson Polymer, Inc.), 12.5 mL of concentrated ammonium hydroxide, and 655 mL of DI water were combined using a Silverson Rotor-Stator Mixer until all of the solids had completely dissolved. To this rapidly stirring solution was added 37.5 g of PY74 as a wet cake (20% moisture content, available from Sun Chemical). The resultant mixture was then stirred for 1 hour at room temperature under high shear mixing conditions using the Silverson Rotor-Stator Mixer at 1,000-5,000 RPMs. The resulting yellow mixture was poured into a Pyrex evaporating dish (approximately ⅓ full) and placed in a Class A oven. The mixture was then heated at 175° C. for 18 hours, thereby forming a solid yellow pigment composition.

The resulting pigment composition was allowed to cool to room temperature and was combined with 400 mL DI water followed by 90 mL of 1M NaOH, and then dispersed under high shear mixing conditions using a Silverson Rotor-Stator Mixer. Mixing was continued for 1 hour at 1,000-5,000 RPMs. The pH was checked periodically during this time and adjusted to be greater than 12.5 with additional 1M NaOH. The resulting aqueous pigment dispersion was then sonicated in an ice bath with a Misonix probe sonicator (Misonix Sonicator 3000) until the mean volume (mV) particle size was below 180 nm (as measured using a Microtrac® Particle Size Analyzer).

The aqueous pigment dispersion was purified by diafiltration using a polysulphone hollow fiber membrane (pore size: 0.05 micron) and 0.1M NaOH as a make-up liquid. The solid content of the retentate was adjusted and held at 10% throughout the diafiltration. After 10 volumes of base, the make-up liquid was changed to DI water and diafiltration was continued until the conductivity of the permeate was <250 microsiemens. The final concentration was adjusted to 10% solids. Finally, the dispersion was further sonicated in an ice bath with the Misonix probe (Misonix Sonicator 3000) until the final mean volume (mV) particle size was approximately 100 nm.

The properties of the resulting aqueous yellow pigment dispersion of the present invention are shown in Table 1 below.

Example 2

An aqueous red pigment dispersion of the present invention was prepared using a procedure similar to that described in Example 1, with the exception that 103 g of Pigment Red 122 presscake (71% moisture content, available from Sun Chemical) was used instead of PY74. The oven temperature was 150° C. for the heating step.

The properties of the resulting aqueous red pigment dispersion of the present invention are shown in Table 1 below.

Example 3

An aqueous blue pigment dispersion of the present invention was prepared using a procedure similar to that described in Example 1, with the exception that 81 g of Pigment Blue 15:4 presscake (63% moisture content, available from Sun Chemical) was used instead of PY74. The oven temperature was 150° C. for the heating step.

The properties of the resulting aqueous blue pigment dispersion of the present invention are shown in Table 1 below.

Example 4

An aqueous black pigment dispersion of the present invention was prepared using a procedure similar to that described in Example 1, with the exception that 30 g of Black Pearls® 700 carbon black (BP700, available from Cabot Corporation) was used instead of PY74. The oven temperature was 150° C. for the heating step.

The properties of the resulting aqueous black pigment dispersion of the present invention are shown in Table 1 below.

Comparative Example 1

An aqueous black pigment dispersion was prepared using a procedure similar to that described in Example 4, with the exception that, after combining the black pigment and the polymer, the resulting mixture was not heated in an oven. The sample was diafiltered directly after the first sonication step.

The properties of the resulting comparative aqueous black pigment dispersion are shown in Table 1 below.
Properties of the Aqueous Pigment Dispersions The properties of the aqueous pigment dispersions of Examples 1-4 and that of Comparative Example 1 are shown Table 1 below.

TABLE 1

Properties of dispersions

| Sample | UPA mv | Na$^+$ (ppm) | % Attachment |
|---|---|---|---|
| Ex 1 | 0.116 | 6,379 | 9.2 |
| Ex 2 | 0.0865 | 13,400 | 24.7 |
| Ex 3 | 0.1191 | 12,103 | 22.4 |
| Ex 4 | 0.1312 | 13,568 | 21.8 |
| Comp Ex 1 | 0.1393 | 7,864 | 14.6 |

As discussed in the examples above, particle size was determined using a Microtrac® Particle Size Analyzer, and the values reported are the mean volume particle size (mV). The sodium ion concentration was determined using an Orion sodium ion selective probe and are reported as micrograms of sodium per gram of solid. The attachment percent was calculated from thermogravimetric analysis (TGA) using a TA Instruments TGA Model 2950. For TGA analysis, the samples were analyzed under a nitrogen atmosphere according to the following temperature profile (unless otherwise noted): 10° C./min up to 110° C., hold at 110° C. for 10 minutes, continue heating at 10° C./min up to 800° C., and hold at 800° C. for 10 minutes. Percent attachment was determined from comparison of the weight lost between 110° C. and 800° C. of the final product compared to that of the starting materials.

As the results in Table 1 show, the pigment compositions of the present invention, prepared by combining a pigment and a polymer comprising an ammonium salt of a carboxylic acid group followed by heating, had a high level of attached polymer and also produced aqueous pigment dispersions having good (lower) pigment particle sizes. The amount of attached polymer would be expected to vary depending on the type and size of the pigment used. However, comparing the two dispersions produced using the same type of pigment (Example 4 and Comparative Example 1, both using the same black pigment), the results clearly show a much higher attachment level using the method of the present invention, as well as a smaller particle size dispersion.

Examples 5-8

Preparation of Inkjet Ink Compositions

Inkjet ink compositions of the present invention were prepared using the aqueous pigment dispersions of Examples 1-4 in the formulation shown in Table 2 below.

TABLE 2

Inkjet Ink Formulation:

| Composition | Amount (%) |
|---|---|
| Aq Pigment Dispersion | 3.5 (solid basis) |
| 2-pyrollidone | 7 |
| 1,5-pentane diol | 7 |
| Trimethylol propane | 5 |
| Surfynol 465 | 0.2% |
| DI Water | remainder |

The black inkjet ink composition of Example 8 was put into an HP45 cartridge and printed from an HP P1000 thermal inkjet printer. Printing was done on three different plain papers: HP Bright White (HPBW), Hammermill Copy Plus (HCP), and Xerox 4024 (4024). The color inkjet ink compositions of Examples 5-7 were printed from a Canon i550 thermal inkjet printer onto various glossy media. Each of the inkjet ink composition of the present invention were found to print well producing printed images having desirable overall properties.

For example, images printed using the black inkjet ink composition of Example 8 were evaluated for OD, drytime, highlighter smear, and waterfastness. Results are shown in Table 3 below.

TABLE 3

Black Print Results on Various Paper Types

|  | HPBW | HCP | 4024 |
|---|---|---|---|
| OD | 1.43 | 0.90 | 0.85 |
| Drytime | 85-90 s | 0-5 s | 5-10 s |
| Highlighter Smear | 0.488 | 0.069 | 0.046 |
| Waterfastness | Yes | Yes | Yes |

In Table 3, drytime refers to the time in seconds when ink no longer shows color transfer to a piece of paper rubbed across the surface of the printed image. Highlighter smear refers to the OD of pigment transferred during a 2 pass highliter rub (average of an acid and base highliter). Finally, waterfastness refers to whether pigment runoff occurs when 1000 microliters of water is dripped onto a printed image at a 45° angle 5 minutes after printing. The results in Table 3 show that the inkjet ink composition of the present invention can be used to produce printed images having good overall properties.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:
1. A method, comprising:
  i) combining a first polymer comprising at least one ammonium salt of a carboxylic acid group and a pigment to form a mixture, and
  ii) heating the mixture to a temperature of between about 140° C. and 285° C. to convert the first polymer to a second polymer different from the first polymer, thereby forming a pigment composition comprising the pigment and the second polymer, wherein the mixture is heated to the temperature of between about 140° C. and 285° C. for at least one hour to form the pigment composition.

2. The method of claim 1, wherein the first polymer is in the form of an aqueous polymer solution.

3. The method of claim 1, wherein the pigment is in the form of an aqueous pigment suspension or dispersion.

4. The method of claim 1, wherein the first polymer and the pigment are combined under high intensity or high shear mixing conditions.

5. The method of claim 1, wherein the first polymer is an ammonium acrylate polymer or ammonium methacrylate polymer.

6. The method of claim 1, wherein the first polymer is a styrene-ammonium acrylate polymer or a styrene-ammonium methacrylate polymer.

7. The method of claim 1, wherein the pigment comprises a blue pigment, a black pigment, a brown pigment, a cyan pigment, a green pigment, a white pigment, a violet pigment, a magenta pigment, a red pigment, a yellow pigment, or mixtures thereof.

8. The method of claim 1, wherein the second polymer is a cross-linked polymer.

9. The method of claim 1, wherein, after ii), the pigment composition is solid.

10. The method of claim 1, wherein the pigment and the first polymer are combined in a weight ratio of between 5:1 and 1:5 pigment to first polymer.

11. The method of claim 10, wherein the weight ratio is between 5:1 and 1:1 pigment to first polymer.

12. The method of claim 1, wherein the first polymer comprises at least 10% by weight of at least one ammonium salt of a carboxylic acid group.

13. The method of claim 12, wherein the first polymer comprises at least 20% by weight of at least one ammonium salt of a carboxylic acid group.

14. The method of claim 12, wherein the first polymer comprises at least 30% by weight of at least one ammonium salt of a carboxylic acid group.

15. The method of claim 1, wherein the second polymer comprises a carboxylic acid group.

16. The method of claim 15, wherein the second polymer is a cross-linked.

17. The method of claim 15, wherein, during ii), ammonia is removed.

18. A method, comprising:
   i) combining a first polymer comprising at least one ammonium salt of a carboxylic acid group and a pigment to form a mixture,
   ii) heating the mixture to a temperature of between about 140° and 285° C. to convert the first polymer to a second polymer different from the first polymer, thereby forming a pigment composition comprising the pigment and the second polymer, and
   iii) dispersing the pigment composition in an aqueous medium to form an aqueous pigment dispersion,
   wherein the mixture is heated to the temperature of between about 140° C. and 285° C. for at least one hour to form the pigment composition.

19. The method of claim 18, wherein the pigment composition is dispersed under high shear mixing conditions.

20. The method of claim 18, wherein the pigment composition is dispersed by addition of a base.

21. The method of claim 18, wherein, after ii), the pigment composition is solid.

22. The method of claim 18, wherein the second polymer is a cross-linked polymer.

23. The method of claim 18, wherein the second polymer comprises the carboxylic acid group.

24. The method of claim 23, wherein the second polymer is a cross-linked polymer.

25. The method of claim 23, wherein, during ii), ammonia is removed.

* * * * *